(12) United States Patent
Hadfield et al.

(10) Patent No.: US 12,492,896 B2
(45) Date of Patent: Dec. 9, 2025

(54) GRADE ROD WITH END CAP AND RELATED METHOD OF USE

(71) Applicant: Milwaukee Electric Tool Corporation, Brookfield, WI (US)

(72) Inventors: Jacob D. Hadfield, Mukwonago, WI (US); Adam J. Sargis, Mount Pleasant, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 578 days.

(21) Appl. No.: 17/930,299

(22) Filed: Sep. 7, 2022

(65) Prior Publication Data

US 2023/0067344 A1 Mar. 2, 2023

Related U.S. Application Data

(63) Continuation of application No. PCT/US2022/075338, filed on Aug. 23, 2022.

(Continued)

(51) Int. Cl.
*G01C 15/06* (2006.01)
(52) U.S. Cl.
CPC .................... *G01C 15/06* (2013.01)
(58) Field of Classification Search
CPC ..................................... G01C 15/06

(Continued)

(56) References Cited

U.S. PATENT DOCUMENTS

| 2,232,824 A | 2/1941 | Maher |
| 2,270,227 A | 1/1942 | Swanson |

(Continued)

FOREIGN PATENT DOCUMENTS

| CN | 2120317 | 10/1992 |
| CN | 2503459 | 7/2002 |

(Continued)

OTHER PUBLICATIONS

Bosch GR-500 Aluminum Telescoping Grade Rod, https://www.midwesttechnology.com/bosch-gr-500-aluminum-telescoping-leveling-rod-16/, believed to be commercially available at least by Apr. 20, 2021, 4 pages.

(Continued)

*Primary Examiner* — John E Breene
*Assistant Examiner* — Daniel M Quinn
(74) *Attorney, Agent, or Firm* — Reinhart Boerner Van Deuren s.c.

(57) ABSTRACT

An end cap for a grade rod and a method of using the same is provided. The end cap has a body that includes a bottom wall and a front wall perpendicular to the bottom wall. An outer surface of the bottom wall is substantially planar. A projection extends outwardly from the front wall. A bottom surface of the projection is substantially planar and substantially aligns with the outer surface of the bottom wall. In specific embodiments, the end cap is attached to an end of a grade rod. To reference the end of a recessed surface, such as a pipe, the end cap body is attached to a lower end of the grade rod. The grade rod is then positioned perpendicular to the ground at an open end of the recessed surface, such that the bottom surface of the projection rests on an interior portion of the recessed surface.

18 Claims, 5 Drawing Sheets

Related U.S. Application Data

(60) Provisional application No. 63/236,553, filed on Aug. 24, 2021.

(58) Field of Classification Search
USPC .......................................................... 33/293
See application file for complete search history.

(56) References Cited

U.S. PATENT DOCUMENTS

| | | | |
|---|---|---|---|
| 2,270,355 A | 1/1942 | Swanson | |
| 2,465,778 A | 3/1949 | Yunger | |
| 2,632,954 A * | 3/1953 | Lieberman | G01C 1/00 |
| | | | 33/339 |
| 3,222,789 A | 12/1965 | Bishop et al. | |
| 3,492,729 A | 2/1970 | Crain | |
| 4,060,909 A | 12/1977 | Collins et al. | |
| 4,146,969 A | 4/1979 | Chaires | |
| 4,318,228 A | 3/1982 | Kimura | |
| 4,345,382 A | 8/1982 | Warren | |
| 4,458,425 A | 7/1984 | Hester | |
| 4,471,532 A | 9/1984 | Francis | |
| 4,899,452 A | 2/1990 | Schafer | |
| 5,566,460 A | 10/1996 | Bates | |
| 5,685,082 A | 11/1997 | Proulx | |
| 6,076,267 A | 6/2000 | Gotoh | |
| 6,209,210 B1 | 4/2001 | Stout | |
| 6,450,292 B1 * | 9/2002 | Sheffield | E06C 7/44 |
| | | | 182/205 |
| 6,502,321 B1 | 1/2003 | Crain et al. | |
| 6,508,006 B1 | 1/2003 | Black | |
| 6,584,697 B1 | 7/2003 | Guoan et al. | |
| 6,688,012 B1 | 2/2004 | Crain et al. | |
| 6,711,826 B2 | 3/2004 | Crain et al. | |
| 7,251,899 B2 | 8/2007 | Yandrick et al. | |
| 7,788,815 B2 | 9/2010 | Yandrick et al. | |
| 8,024,866 B2 | 9/2011 | Chiorean et al. | |
| 8,201,340 B2 | 6/2012 | Steffensen | |
| 8,875,408 B2 | 11/2014 | Steffensen | |
| 9,182,209 B1 | 11/2015 | Johnson | |
| 9,618,313 B1 | 4/2017 | Johnson | |
| 2002/0073562 A1 | 6/2002 | Brink | |
| 2006/0283030 A1 * | 12/2006 | Lee | G01C 15/06 |
| | | | 33/293 |

FOREIGN PATENT DOCUMENTS

| | | | |
|---|---|---|---|
| CN | 203657798 | 6/2014 | |
| CN | 204286441 | 4/2015 | |
| CN | 204313844 | 5/2015 | |
| CN | 205049147 | 2/2016 | |
| CN | 206593546 | 10/2017 | |
| CN | 210400397 | 4/2020 | |
| CN | 210774072 | 6/2020 | |
| CN | 211601967 | 9/2020 | |
| CN | 211855349 | 11/2020 | |
| CN | 212721151 | 3/2021 | |
| DE | 1824502 | 1/1961 | |
| DE | 19826873 | 11/1999 | |
| DE | 202006013045 | 12/2006 | |
| DE | 102006039752 | 10/2007 | |
| KR | 101854173 | 5/2018 | |
| KR | 102039931 B1 * | 11/2019 | G01C 15/06 |
| WO | WO17066836 | 4/2017 | |

OTHER PUBLICATIONS

International Search Report and Written Opinion for International Application No. PCT/US2022/075338 dated Dec. 5, 2022, 10 pages.

* cited by examiner

GRADE ROD WITH END CAP AND RELATED METHOD OF USE

CROSS-REFERENCE TO RELATED APPLICATION

This application is a continuation of International Application No. PCT/2022/075338, filed Aug. 23, 2022, which claims the benefit of and priority to U.S. Provisional Application No. 63/236,553, filed Aug. 24, 2021, the contents of which are is incorporated herein by reference in their entireties.

BACKGROUND OF THE INVENTION

The present invention relates generally to the field of surveying equipment. The present invention relates specifically a grade rod or similar device with an end cap having a projection configured to rest against an interior portion of a recessed surface, such as a pipe.

SUMMARY OF THE INVENTION

One embodiment of the invention relates to a grade rod. The grade rod has a body, an upper end, and a lower end. The grade rode includes an end cap coupled to the lower end of the grade rod. The end cap includes a body and a projection. The body includes a bottom wall and a front wall that is substantially perpendicular to the bottom wall. The projection extends outward away from the front wall of the end cap. In specific embodiments, the bottom wall has a substantially planar outer surface. The projection includes a bottom surface that substantially aligns with the outer surface of the bottom wall. The projection extends from the front wall for a shorter distance along the front wall than the length of the bottom wall outer surface.

In a specific embodiment, the projection includes a top surface. At least a first point of the top surface is positioned closer to the bottom surface than a second point of the top surface. In one embodiment, the top surface is planar. In another embodiment, the top surface is formed in an L shape.

In specific embodiments, the end cap further includes a foot attached to the bottom wall. In one embodiment, the foot is comprised of polymer material or a rubber material. In certain embodiments, the foot is attached to the bottom wall with screws.

In specific embodiments, the body of the end cap includes a bottom wall, a front wall, a back wall, and two opposing sidewalls. The front wall, back wall, and sidewalls are each positioned substantially perpendicularly to the bottom wall. The bottom wall has a substantially planar outer surface. The back wall and opposing sidewalls of the end cap are attached to the lower end of the grade rod. The projection of the end cap extends outwardly from a portion of the front wall and includes a bottom surface that is coplanar with the outer surface of the bottom wall. The projection extends along the front wall for a distance that is shorter than the length of the bottom wall.

Another specific embodiment relates to a method of using a grade rod with an attached end cap. The grade rod includes an upper end and a lower end. The grade rod further includes a front surface. Gradation indicators are marked on the front surface. The end cap is attached to the lower end of the grade rod. The end cap includes a front wall. The end cap is attached to the grade rod such that the front wall aligns with the front surface of the grade rod. A projection extends from the front wall in a direction away from the grade rod. To use the grade rod with attached end cap, the grade rod is positioned sustainably perpendicularly to a ground surface near an opening of a recessed surface. The lower end of the grade rod is positioned closer to the ground surface than the upper end of the grade rod. The projection is positioned toward the opening of the recessed surface. The grade rod is moved toward the opening of the recessed surface until the projection is positioned at least in part within the recessed surface. The bottom surface of the projection is then rested on a lower interior portion of the recessed surface.

Another specific embodiment relates to a grade rod configured to reference an end of a recessed surface. The grade rod includes an elongate rod section with an upper end, a lower end, and gradation indicators spaced between the upper end and the lower end. An end cap is coupled to the lower end of the elongate rod section. The end cap has a front wall, a bottom wall that extends inwardly from the front wall, and a projection that extends outwardly from the front wall such that the projection extends away from the lower end of the elongate rod section. The projection is configured to be positioned within an opening defined by the recessed surface.

Another specific embodiment relates to a grade rod with a telescoping body. The telescoping body has a longitudinal axis, an upper end, a lower end that spaced apart from the upper end along the longitudinal axis, and gradation indicators that are spaced between the upper end and the lower end. The telescoping body is configured to telescope along the longitudinal axis. A projection is coupled to the lower end of the telescoping body. The projection includes a lower support surface that extends away from the telescoping body perpendicular to the longitudinal axis of the telescoping body.

Yet another specific embodiment relates to a method for referencing an end of a recessed surface supported by a ground surface. The method includes providing a grade rod that has an elongate shape. The grade rod has an upper end, a lower end, and a projection that extends outwardly from the lower end of the grade rod in a direction away from the grade rod. The method further includes orienting the grade rod substantially perpendicularly to the ground surface such that the lower end of the grade rod is positioned nearer to the ground surface than the upper end up the grade rod. Additionally, the method includes positioning the projection within an opening defined by the recessed surface, while the grade rod remains oriented substantially perpendicularly to the ground surface. Further, the method includes resting the projection on an interior portion of the recessed surface such that the grade rod is oriented substantially perpendicularly to the ground surface while the projection is within the opening.

Alternative exemplary embodiments relate to other features and combinations of features as may be generally recited.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of an end cap are shown. This end cap is used with a grade rod or leveling rod, or with another form of surveying rod or pole used to reference end points of recessed surfaces, such as the recessed surface of a pipe supported by a ground surface.

Currently, if a user needs to reference the end of a recessed surface, such as a buried pipe, with a surveying instrument, such as a grade rod, the user typically holds the end of the grade rod in place adjacent to or above the end of the pipe. To achieve better accuracy in reference readings, the grade rod is hovered at the end of the pipe to maintain an orientation substantially perpendicular to the ground. This may be tiring for the user, and if the user is unable to hold the grade rod still in this manner, the user may cant the grade rod so that the lower end of the grade rod rests inside of the pipe, relieving tension from the user's arms. However, in this configuration, the grade rod is no longer substantially perpendicular to the ground surface below, diminishing the accuracy of the readings obtained from the grade rod.

Applicant has designed an end cap that can be attached to the end of a grade rod. The end cap includes a projection that is sized to fit at least partially within the opening of a recessed surface, such as pipe, while allowing the grade rod to maintain an orientation perpendicular to the ground surface directly below the pipe. Thus, when a user is referencing the end point of a pipe, the user may rest the end cap projection on a lower interior surface of the pipe and still maintain the accuracy of the readings taken off the grade rod. In this setup, the user does not have to undertake the tiring effort of holding the grade rod still and airborne to maintain the quality of the grade rod readings. Further, as discussed in more detail below, Applicant has designed a specific end cap with the supporting projection that is easy to use, durable and includes other features that are suitable for use in a construction environment.

Figure 1:
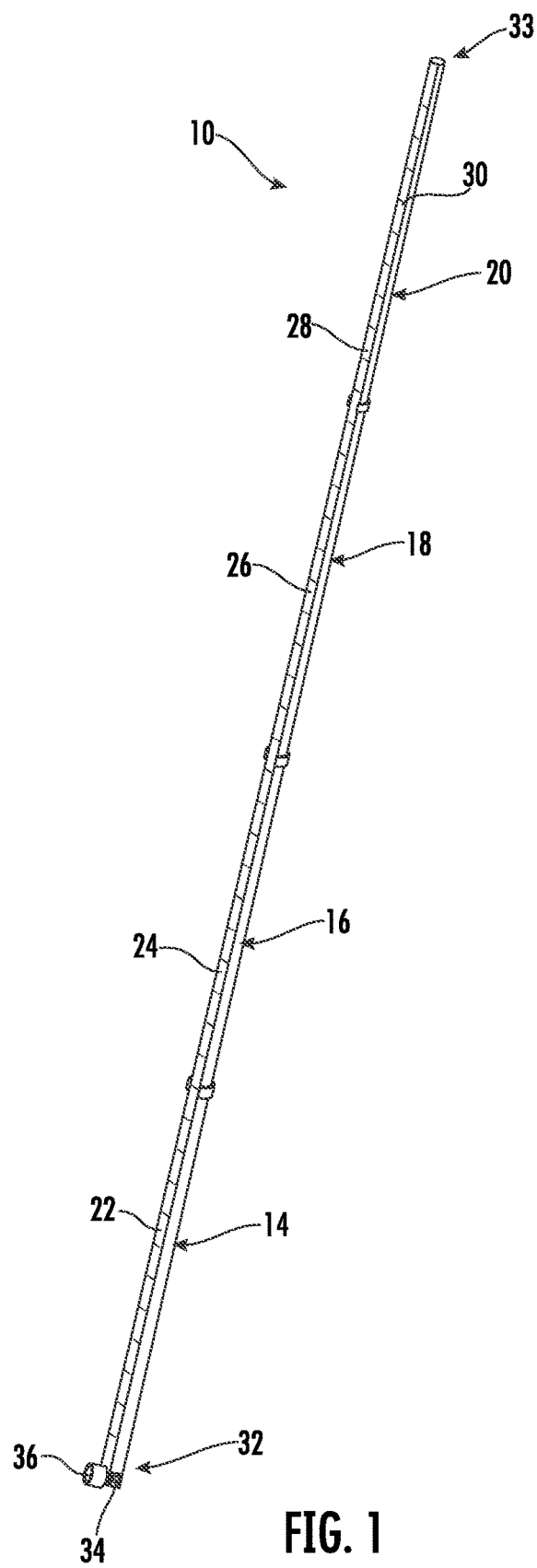
FIG. 1 is a perspective view of a telescoping grade rod with an attached end cap, according to an exemplary embodiment. The end cap is positioned near an end portion of a schematic pipe. Schematic grade lines are shown on the grade rod for illustrative purposes.

Referring to the figures, FIG. 1 shows a grade rod, shown as a telescoping grade rod 10. In this embodiment, the grade rod 10 includes multiple telescoping sections, 14, 16, 18, 20. Specifically, grade rod 10 has a telescoping body. In other embodiments, the grade rod may include a different number of telescoping sections, or it may include multiple sections that are not telescoping or a single rod section that does not include a telescoping function. Each rod section 14, 16, 18, 20 of the grade rod 10 includes a front surface 22, 24, 26, 28 on which gradation indicators 30 are marked. In specific embodiments, the grade rod 10 has an elongate shape that includes a lower end 32 and an upper end 33, and gradation indicators 30 are spaced between lower end 32 and upper end 33. Additionally, grade rod 10 has a longitudinal axis with lower end 32 spaced apart from upper end 33 along the longitudinal axis. Likewise, each telescoping section 14, 16, 18, 20, is an elongate rod section that longitudinally telescope, i.e. telescope along the longitudinal axis of grade rod 10, with respect to one another. Further, grade rod 10 includes an end cap 34 attached to the lower end 32 of grade rod 10, and, when in use, end cap 34 is positioned near an end portion of a schematic pipe 36.

Figure 2:
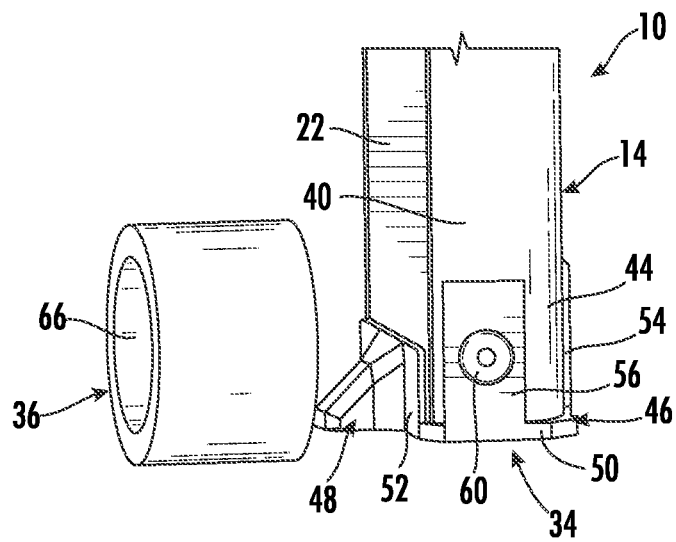
FIG. 2 is an enlarged perspective view of the end cap, the schematic pipe, and a portion of the grade rod shown in FIG. 1.
Figure 3:
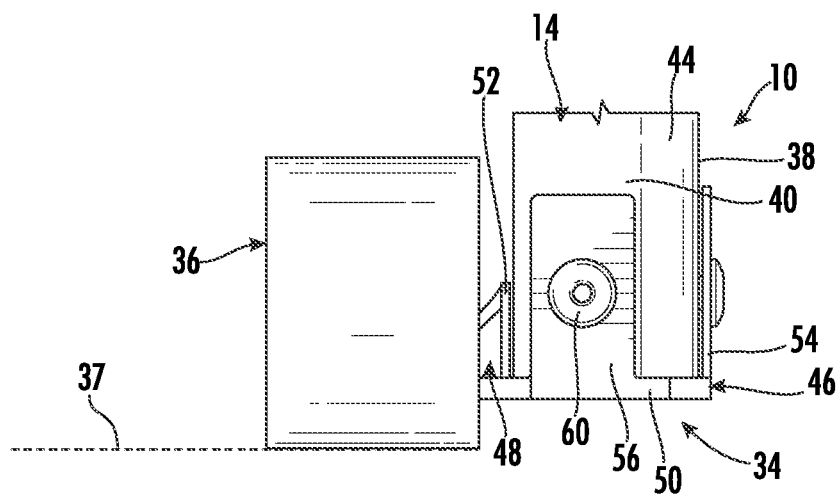
FIG. 3 is a side view of the end cap shown in FIG. 1, positioned within the schematic pipe.
Figure 4:
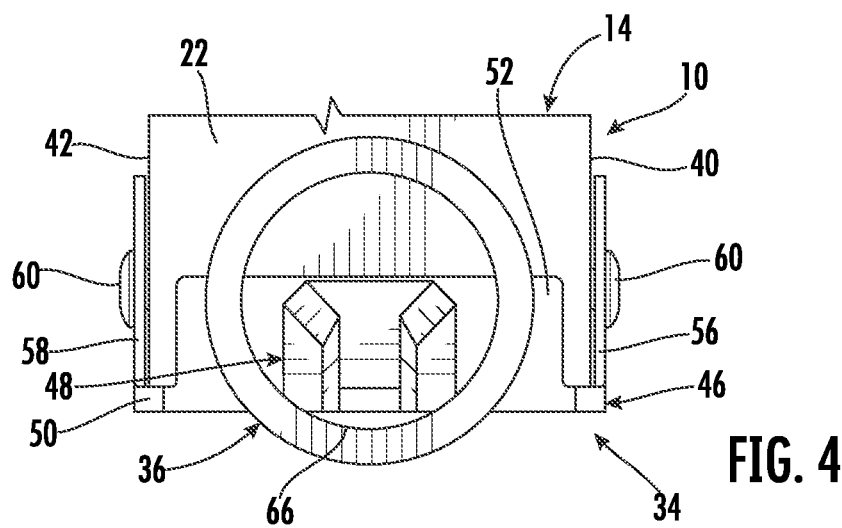
FIG. 4 is a front view of the end cap shown in FIG. 1, positioned within the schematic pipe.

Referring to FIGS. 2-4, a portion of rod section 14 of grade rod 10 is shown. Section 14 of grade rod 10 includes front surface 22, as well as a rear surface 38 opposite the front surface, a first side surface 40, and an opposing second side surface 42. In this embodiment, the first side surface 40 is connected to the rear surface 38 by curved first connecting surface 44, and the second side surface is connected to the rear surface 38 by a curved second connecting surface (not shown) the mirrors first connecting surface 44.

As shown in FIGS. 2-4, the end cap 34 is attached to the lower end 32 of grade rod 10. End cap 34 includes a body 46 and a projection 48. In general, projection 48 is coupled to (specifically is integral with) body 46 and extends way from grade rod 10 to provide a structure for easy support from a recessed surface, such as pipe 36, while maintaining grade rod 10 perpendicular to the pipe, ground, etc.

Body 46 includes a bottom wall 50. A front wall 52 extends from bottom wall 50, substantially perpendicular to bottom wall 50. In specific embodiments, bottom wall 50 is coupled to front wall 52 such that bottom wall 50 extends inwardly from front wall 52. A back wall 54 extends from the bottom wall 50, substantially perpendicular to bottom wall 50 and opposite from front wall 52. Opposing sidewalls 56, 58 extend from bottom wall 50, substantially perpendicular to bottom wall 50. In the embodiment shown, when end cap 34 is attached to lower end 32 of grade rod 10, sidewalls 56, 58 respectively connect to first side surface 40 and second side surface 42, and back wall 54 connects to rear surface 38. In the specific embodiment shown, the above connections are formed by a fastener, shown as screws 60. In other embodiments, the above connections may be formed by other mechanical fasteners or by an applied adhesive.

Figure 6:
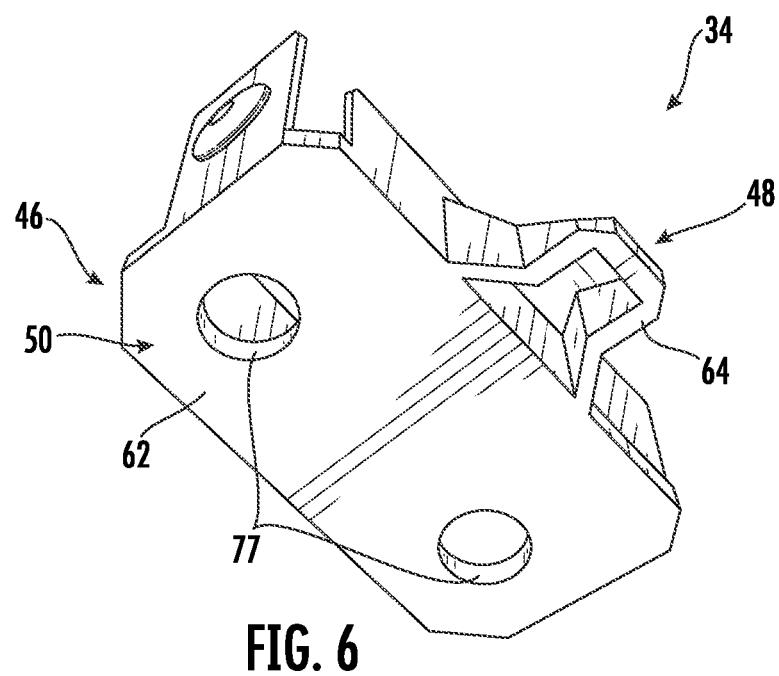
FIG. 6 is a bottom perspective view of the end cap shown in FIG. 1.
Figure 7:
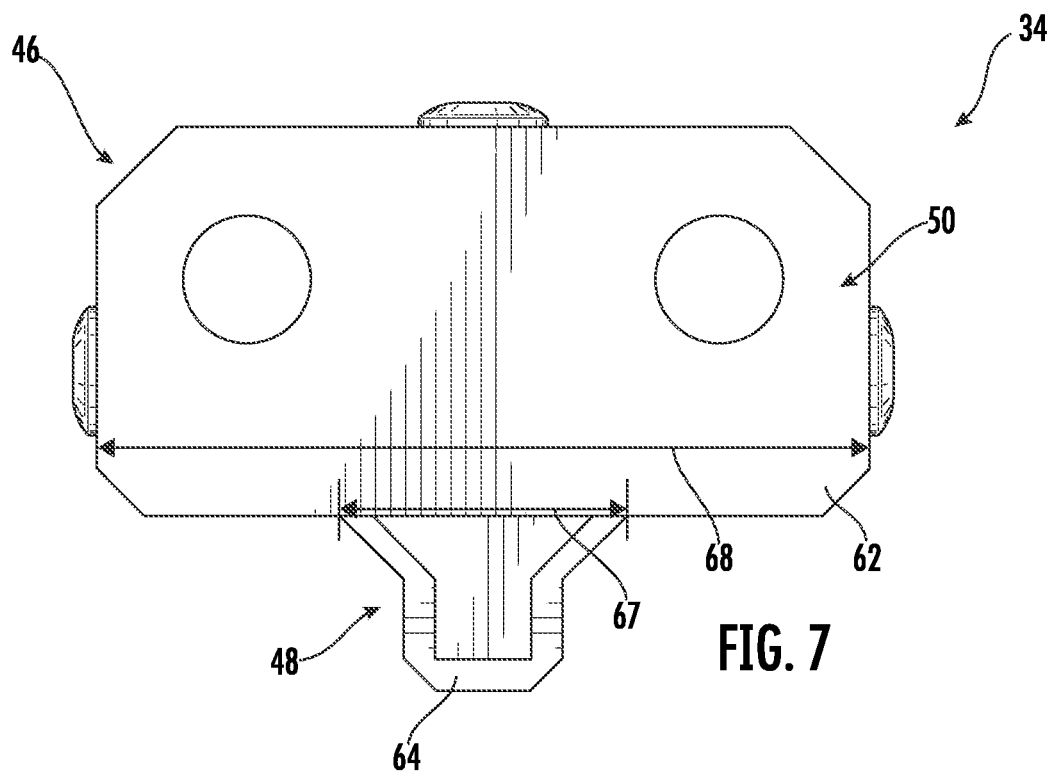
FIG. 7 is a bottom view of the end cap shown in FIG. 1.
Figure 8:
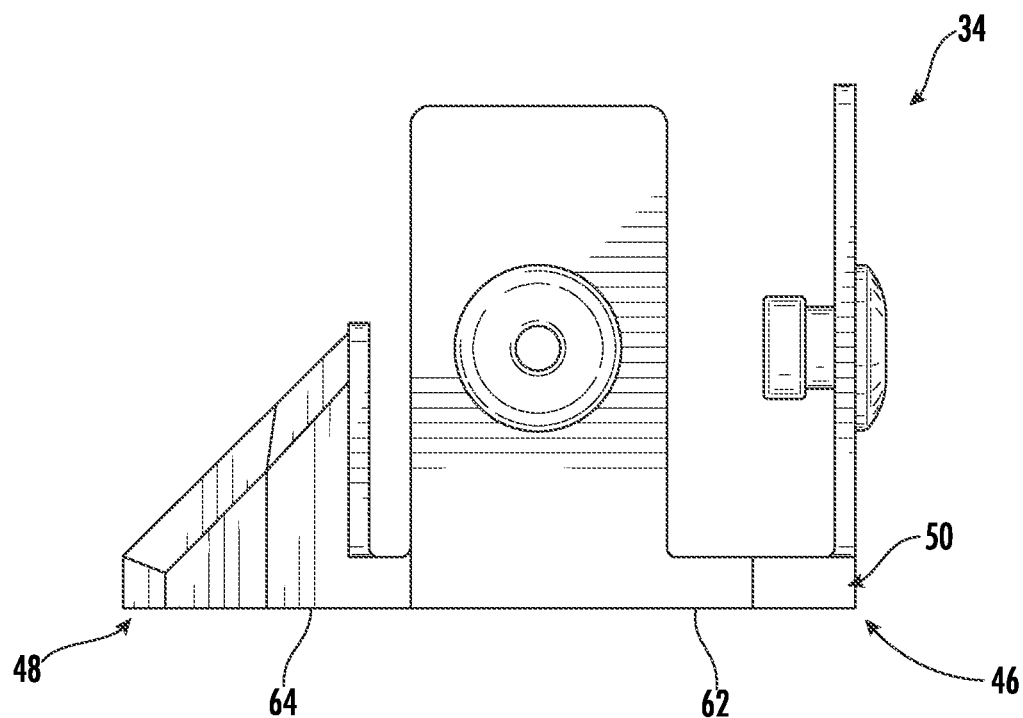
FIG. 8 is a side view of the end cap shown in FIG. 1.

The projection 48 extends outwardly from front wall 52, in a direction away from grade rod 10. Referring to FIGS. 6-8, the bottom wall 50 of end cap body 46 has an outer surface 62 that is substantially planar. The projection 48 includes a bottom surface 64, which serves as a lower support surface. In specific embodiments, bottom surface 64 substantially aligns with outer surface 62 of bottom wall 50. In certain specific embodiments, the bottom surface 64 is a substantially planar surface. Further, in certain specific embodiments, the bottom surface 64 is coplanar with the outer surface 62.

Referring back to FIGS. 1-4, during operation to reference an end of a recessed surface supported by a ground surface, a grade rod, such as grade rod 10, is provided. Grade rod 10 is oriented substantially perpendicularly to a ground surface 37 (see FIG. 3) that supports an end of a recessed surface, such as pipe 36. The lower end 32 of grade rod 10 is positioned nearer to pipe 36 and to the ground surface 37 supporting pipe 36 than the upper end 33, such that end cap 34 is located adjacent to pipe 36. The front wall 52 of end cap body 46 is aligned with the front surface 22 of first rod section 14. When grade rod 10 is positioned for readings to reference the end of pipe 36, the projection 48 of end cap 34 is positioned at least in part within the pipe 36, specifically within an opening defined by pipe 36, such that the bottom surface 64 of projection 48 rests on an interior surface 66 of pipe 36. The grade rod 10 remains substantially perpendicular to the ground surface 37 when the projection 48 is resting within the pipe 36.

Figure 5:
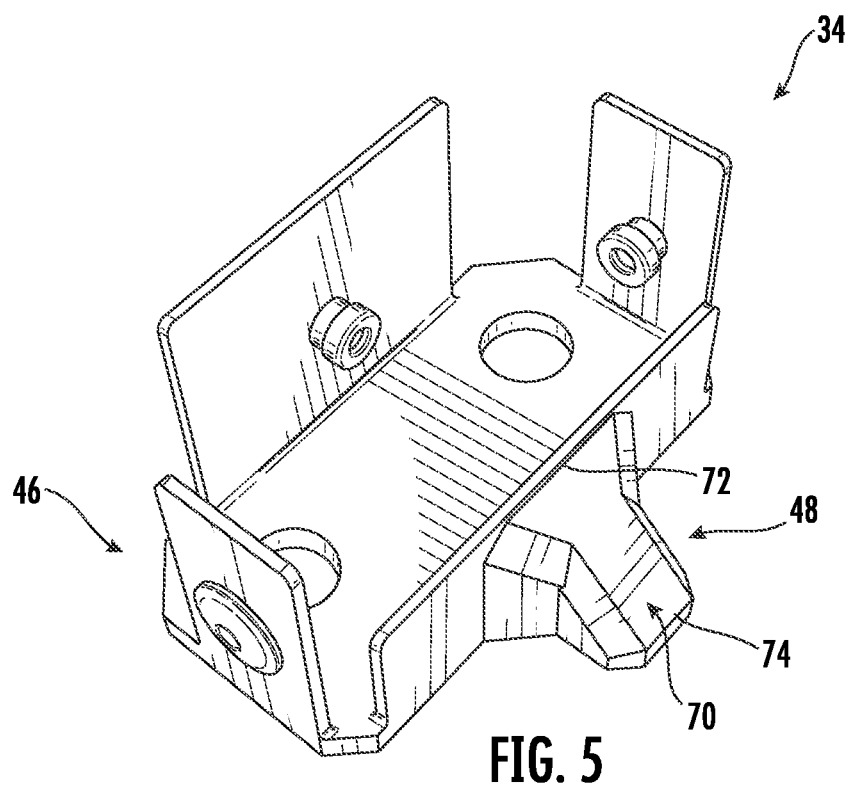
FIG. 5 is a top perspective view of the end cap shown in FIG. 1.

Referring to FIGS. 5-8, details are shown of the structure of end cap 34 unattached to grade rod 10. Referring to FIG. 5, projection 48 includes a top surface 70. The top surface 70 is extends at a downward angle from an upper point 72 to a lower point 74. The upper point 72 is positioned nearer to the front wall 52 than the lower point 74. Referring to FIG. 7, the outer surface 62 of bottom wall 50 of end cap 34 has a length 68. The projection 48 extends from the front wall 52 a distance 67 along the front wall 52, specifically along a length of the front wall 52, that is less than the length 68. Overall, projection 48 is sized to fit at least in part within a variety of typical hollow structures/pipes during referencing operation. As shown in FIG. 3, projection 48 is positioned in part within pipe 36, such that lower point 74 is positioned within pipe 36 and upper point 72 is positioned outside pipe 36.

Figure 9:
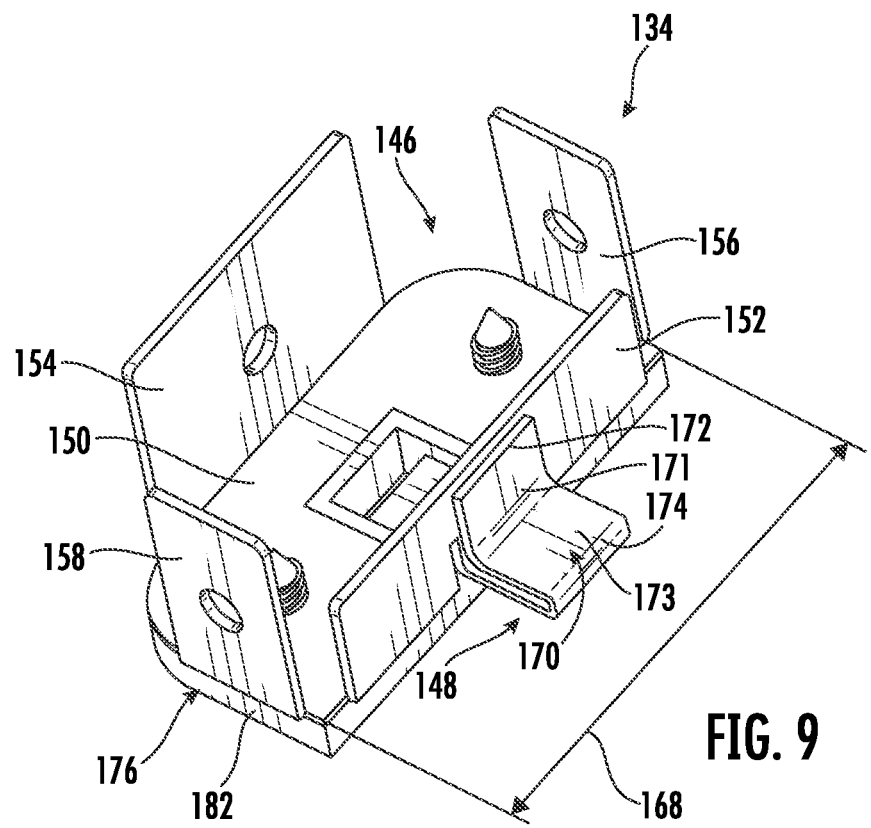
FIG. 9 is a top perspective view of another grade rod end cap, according to an exemplary embodiment.
Figure 10:
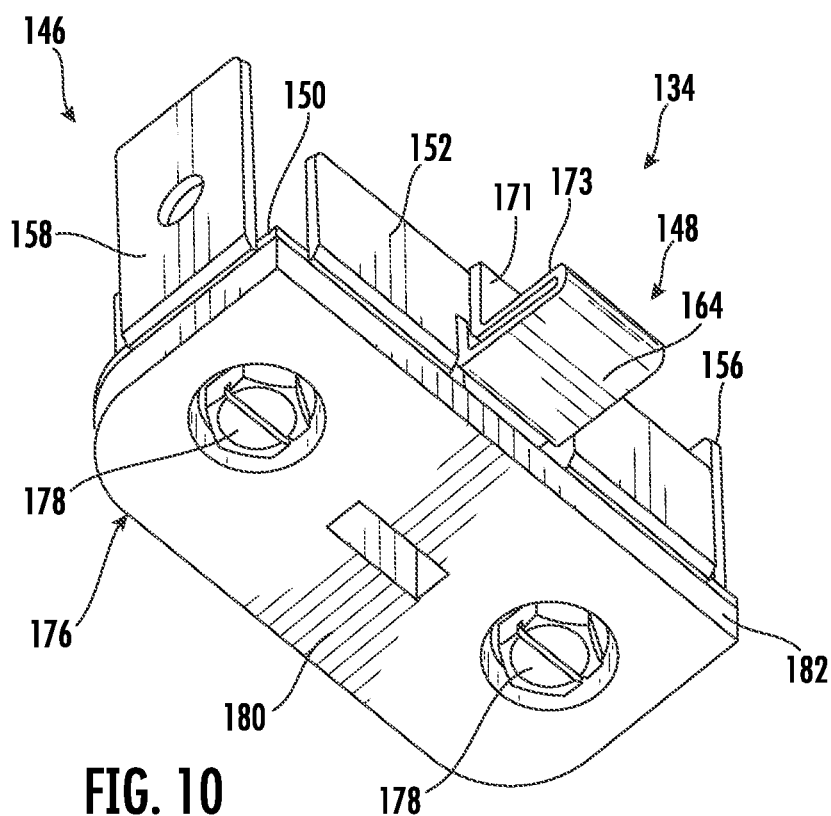
FIG. 10 is a bottom perspective view of the end cap shown in FIG. 9.

Referring to FIGS. 9-10, another embodiment of an end cap for a grade rod, shown as end cap 134, is shown. End cap 134 is substantially the same as end cap 34 except for the differences discussed herein. The end cap 134 includes a body 146 and a projection 148. The body 146 includes a bottom wall 150. A back wall 154 and opposing sidewalls 156, 158 extend perpendicularly from bottom wall 150 and are configured to connect to the lower end 32 of grade rod 10 in a similar manner as described above with respect to back wall 54 and opposing sidewalls 56, 58. A front wall 152 extends perpendicularly from bottom wall 150, opposite back wall 154.

The projection 148 extends outwardly from front wall 152. The bottom wall 150 of end cap body 146 has an outer surface that is substantially planar. In this embodiment, a foot 176 is coupled to the bottom wall 150, and in the embodiment shown, foot 176 covers bottom wall 150. In this embodiment, foot 176 is made from a compliant, durable, high friction polymer material, such as rubber. In other embodiments, the foot may be made of another compliant material or high friction materials, such as MBR, TPU, or silicon. Here, the foot 176 is connected to the bottom wall 150 by screws 178. In other embodiments, the foot 176 may be connected to the bottom wall 150 by an alternate form of mechanical fastener or by an applied adhesive. In various embodiments, end cap 34 includes foot 176 coupled to its lower surface at connection points 77 (see FIG. 6). In the event the end of the recessed surface being measured is near to the ground surface, a bottom surface 180 of the foot 176 may rest on the ground surface during operation. Additionally, a front surface 182 of the foot 176 may rest against the pipe 36 (shown in FIGS. 1-4) when the projection 148 is positioned at least partially within the pipe 36 and is resting on the interior pipe surface 66 during operation.

Referring again to FIGS. 9-10, the projection 148 includes a bottom surface 164 that substantially aligns with the outer surface of bottom wall 150. In this embodiment, the bottom surface 164 is coplanar with the outer surface 162. The outer surface of bottom wall 150 has a length 168. The projection 148 extends from the front wall 152 for a shorter distance along the front wall 152 than the length 168. In this embodiment, projection 148 includes a top surface 170. The top surface 170 is formed into an L shape that has a vertical surface 171 and a horizontal surface 173 extending perpendicularly from the vertical surface. The top surface 170 includes an upper point 172 located on the vertical surface. The top surface 170 further includes at least one lower point 174 on the horizontal surface. In specific embodiments, the horizontal surface of the L shape is parallel to the bottom surface 164. Lower point 174 is positioned below upper point 172 and further from the front wall 152 than upper point 172. Overall, projection 148 is sized to fit at least in part within a variety of typical hollow structures/pipes during referencing operation.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention. In addition, as used herein, the article "a" is intended to include one or more component or element and is not intended to be construed as meaning only one.

Various embodiments of the invention relate to any combination of any of the features, and any such combination of features may be claimed in this or future applications. Any of the features, elements, or components of any of the exemplary embodiments discussed above may be utilized alone or in combination with any of the features, elements or components of any of the other embodiments discussed above.

What is claimed is:

1. A grade rod configured to reference an end of a recessed surface, the grade rod comprising:
an elongate rod section comprising an upper end, a lower end, and gradation indicators spaced between the upper end and the lower end; and
an end cap coupled to the lower end of the elongate rod section, the end cap comprising:
a front wall,
a bottom wall extending inwardly from the front wall, the bottom wall having a first side surface and a second side surface opposite the first side surface and
a projection extending outwardly from the front wall such that the projection extends away from the lower end of the elongate rod section and the front wall is positioned between the projection and the elongate rod section, the projection positioned along the front wall such that the projection is spaced a first distance from the first side surface of the bottom wall and is spaced a second distance from the second side surface of the bottom wall, wherein the projection extends a first length along the front wall that is less than a second length of the bottom wall measured between the first side surface and the second side surface, the projection configured to be positioned within an opening defined by the recessed surface.

2. The grade rod of claim 1, wherein the bottom wall extends perpendicularly from the front wall.

3. The grade rod of claim 2, wherein the bottom wall comprises an outer surface defining a plane, and wherein the projection has a bottom surface that is coplanar with the plane defined by outer surface of the bottom wall.

4. The grade rod of claim 3, wherein the outer surface of the bottom wall defines the second length of the bottom wall, and wherein the bottom surface of the projection defines the first length of the projection.

5. The grade rod of claim 3, wherein the end cap further comprises a back wall positioned opposite the front wall, the back wall extending perpendicularly from the bottom wall, wherein the bottom wall extends between the back wall and the front wall, and wherein the back wall is coupled to the lower end of the elongate rod section.

6. The grade rod of claim 5, wherein the end cap further comprises a first sidewall extending perpendicularly from the outer surface of the bottom wall and a second sidewall positioned opposite the first sidewall along the bottom wall and extending perpendicularly from the outer surface of the bottom wall, wherein the bottom wall extends between the first sidewall and the second sidewall, and wherein the first sidewall and the second sidewall are each coupled to the lower end of the elongate rod section.

7. The grade rod of claim 3, wherein the projection further comprises a top surface, the top surface extending at a downward angle from an upper point to a lower point, the upper point located nearer to the front wall than the lower point.

8. The grade rod of claim 3, wherein the projection further comprises a top surface, the top surface comprising a vertical surface and a horizontal surface extending perpendicularly from the vertical surface.

9. The grade rod of claim 1, further comprising a foot coupled to the bottom wall, opposite the elongate rod section, the foot configured to rest on a ground surface adjacent the recessed surface.

10. The grade rod of claim 9, wherein the foot comprises a compliant material.

11. The grade rod of claim 10, wherein the compliant material comprises rubber.

12. The grade rod of claim 1, wherein the elongate rod section is a first elongate rod section, and further comprising a second elongate rod section coupled to the upper end of the first elongate rod section, such that the second elongate rod section longitudinally telescopes with respect to the first elongate rod section.

13. A grade rod comprising:
a telescoping body comprising a longitudinal axis, an upper end, a lower end spaced apart from the upper end along the longitudinal axis, and gradation indicators spaced between the upper end and the lower end, the telescoping body configured to telescope along the longitudinal axis; and
a projection coupled to the lower end of the telescoping body, the projection comprising a lower support surface that extends away from the telescoping body perpendicular to the longitudinal axis of the telescoping body; and
an end cap coupled to the lower end of the telescoping body, the end cap comprising a front wall positioned between the projection and the telescoping body, and a bottom wall perpendicular to the front wall, the bottom wall extending below the telescoping body; and
wherein the projection is spaced a first distance from a first side surface of the bottom wall and is spaced a second distance from a second side surface of the bottom wall opposite the first side surface, wherein the projection extends a first length along the front wall that is less than a second length of the bottom wall measured between the first side surface and the second side surface.

14. The grade rod of claim 13, wherein the projection further comprises a top surface, the top surface extending at a downward angle from an upper point to a lower point, the upper point located nearer to the telescoping body than the lower point.

15. The grade rod of claim 13, wherein the projection further comprises a top surface, the top surface comprising a vertical surface and a horizontal surface extending perpendicularly from the vertical surface.

16. The grade rod of claim 15, wherein the top surface includes an upper point located on the vertical surface and a lower point located on the horizontal surface, the upper point located nearer to the telescoping body than the lower point.

17. The grade rod of claim 13, wherein the lower support surface of the projection defines a plane.

18. The grade rod of claim 17, wherein the bottom wall is aligned with the lower support surface of the projection such that an outer surface of the bottom wall is coplanar with the plane defined by the lower support surface.

* * * * *